US006400862B1

United States Patent
Liu et al.

(10) Patent No.: US 6,400,862 B1
(45) Date of Patent: Jun. 4, 2002

(54) RETRO-REFLECTIVE MULTI-PORT FILTER DEVICE WITH TRIPLE-FIBER FERRULE

(75) Inventors: Yuqiao Liu, Sunnyvale; Peter C. Chang, Mountain View, both of CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 09/576,758

(22) Filed: May 23, 2000

(51) Int. Cl.[7] .................................................. G02B 6/28
(52) U.S. Cl. ........................................... 385/24; 385/33
(58) Field of Search ............................. 385/24, 33, 31, 385/27, 37; 359/130, 131, 127

(56) References Cited

U.S. PATENT DOCUMENTS

| | | | | |
|---|---|---|---|---|
| 4,111,524 A | * | 9/1978 | Tomlinson, III | 385/37 |
| 4,474,424 A | * | 10/1984 | Wagner | 359/127 |
| 5,748,350 A | * | 5/1998 | Pan et al. | 359/130 |
| 5,845,023 A | * | 12/1998 | Lee | 385/33 |
| 6,275,630 B1 | * | 8/2001 | Yang et al. | 385/37 |

* cited by examiner

Primary Examiner—Brian Sircus
Assistant Examiner—Brian S. Webb

(57) ABSTRACT

A retro-reflective multi-port fiber optic device (100) includes the triple-fiber ferrule (10) with a GRIN rod lens (12) to couple the light. The triple-fiber ferrule (10) with three fibers (18, 20, 22) thereof is attached to the angled facet of the GRIN rod lens (12) and the WDM filter (14) is attached to the opposite side of the lens (12). A reflective mirror (16) is attached next to the other side of the WDM filter (14) opposite to the lens (12) after alignment. The triple-fiber ferrule (10) is used to couple light in and out of the device, and tune the thin film filter center wavelength to the desired ITU grid. Therefore, the coupled-in light from the common input pigtail fiber (18) of the triple-fiber ferrule (10) will be collimated and transmitted unto the WDM filter (14) wherein the part of the in-pass-band light with regard to the WDM filter (14) will transmit through the WDM filter (14), and then successively retro-reflect back by the mirror (16) and further transmit through the WDM band-pass filter (14) again. The retro-reflected in-pass-band signal is then coupled into one retro-reflective transmission output fiber/port (22) of the triple-fiber ferrule (10) as a demultiplexed channel. On the other hand, the out-pass-band light with regard to the WDM filter will not transmit through the WDM filter (14) to interact with the mirror (16), but instead be directly reflected back by the WDM filter (14) and coupled into a reflection output fiber/port (20) of the triple-fiber ferrule (14) to be transmitted to the next stage for further demultiplexing other channels.

14 Claims, 4 Drawing Sheets

RETRO-REFLECTIVE MULTI-PORT FILTER DEVICE WITH TRIPLE-FIBER FERRULE

BACKGROUND OF THE INVENTION

1. Field of the Invention

The invention relates to the technology of making optical WDM (Wavelength-Division-Multiplexing) multiplexer or demultiplexer using triple-fiber ferrule.

2. The Related Art

The future communication networks demand ever increasing bandwidth. By transmitting several channels in a single optical fiber at different wavelengths, WDM can greatly enhance the retro-reflective transmission capacity of the optical fiber communication networks. A device that combines different wavelength channels into one fiber is a so-called multiplexer, and a device that divides the multiplexed channels into individual ones is a so-called demultiplexer. A variety of technologies have been exploited to develop high performance WDM multiplexer/demultiplexer, including fiber Bragg granting, optical integrated circuit, fused fiber Mach-Zander interferometer, interference dielectric thin film coating technology etc. An international standard wavelength grid has been suggested by the ITU (International Telecommunication Union) for the center wavelengths of the WDM channels. The prior arts use a Y-branch structure of three conventional fiber optic collimators to tune the filter center wavelength to the ITU grid. The center wavelength of such a multiplexer/demultiplexer is made to coincide with a desired ITU wavelength. The disadvantage in the prior arts is mainly in the difficulty of reducing its size to achieve a robust and compact structure thereof. The basic principle and an approach have been disclosed in the copending application Ser. No. 09/255,047 filed on Feb. 22, 1999, in which a robust and compact structure multiplexer/demultiplexer relative to the prior arts is presented by means of V-groove ferrules. Anyhow, it is still desired to have a smaller, less-components structure for the multiplexer/demultiplexer. The related arts can be referred to U.S. Pat. Nos. 4,464,022, 5,204,771, 5,574,596, 5,629,995, 5,712,717, 5,748,350, 5,764,825, 5,786,915, 5,799,121 and 5,808,763.

Therefore, an object of the invention is to provide a multiplexer/demultiplexer with a half-sized structure thereof relative to that disclosed in the aforementioned copending application so as to result in a compact, robust structure thereof, low cost and flexibility in manufacturing, and high stability in hazardous environment.

SUMMARY OF THE INVENTION

According to an aspect of the invention, a retro-reflective multi-port fiber optic device includes the triple-fiber ferrule with a GRIN rod lens to couple the light. The triple-fiber ferrule with three fibers thereof is attached to the angled facet of the GRIN rod lens and the WDM filter is attached to the opposite side of the lens. A reflective mirror is attached next to the other side of the WDM filter after alignment. The triple-fiber ferrule is used to couple light in and out of the device, and tune the thin film filter center wavelength to the desired ITU grid. Therefore, the coupled-in light from the common input pigtail fiber of the triple-fiber ferrule will be collimated and transmitted unto the WDM filter wherein the part of the in-pass-band light with regard to the WDM filter will transmit through the WDM filter, and then successively retro-reflect back by the mirror and further transmit through the WDM band-pass filter again. The retro-reflected in-passband signal is then coupled into one retro-reflective transmission output fiber/port of the triple-fiber ferrule as a demultiplexed channel. On the other hand, the out-pass-band light with regard to the WDM filter will not transmit through the WDM filter to interact with the mirror, but instead be directly reflected back by the WDM filter and coupled into a reflection output fiber/port of the triple-fiber ferrule to be transmitted to the next stage for further demultiplexing other channels.

Substantially same incidence angles to the WDM filter are required for the transmitted and retro-reflected in-pass-band light beam to achieve the best performance from the WDM filter. In order to maintain the same incidence angle unto the WDM filter, the three pigtail fiber in the triple-fiber ferrule are located on the same circumference with a diameter defined by the common input pigtail fiber and the reflection output pigtail fiber at two opposite ends thereof. Typically, the three fibers are arranged to be positioned at three tips of a T-shape. The center of the corresponding circle is also substantially coincident with the optical axis of the lens. The spacing among the three fibers is selected to match the WDM filter so that the WDM filter center wavelength is tuned to a pre-designated wavelength.

The invention results in especially low cost and high flexibility in achieving a series of different fiber spacing for tuning the center wavelength of the band-pass WDM filter to coincide with that of the ITU grid.

DETAILED DESCRIPTION OF THE PREFERRED EMBODIMENT

References will now be in detail to the preferred embodiments of the invention. While the present invention has been described in with references to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
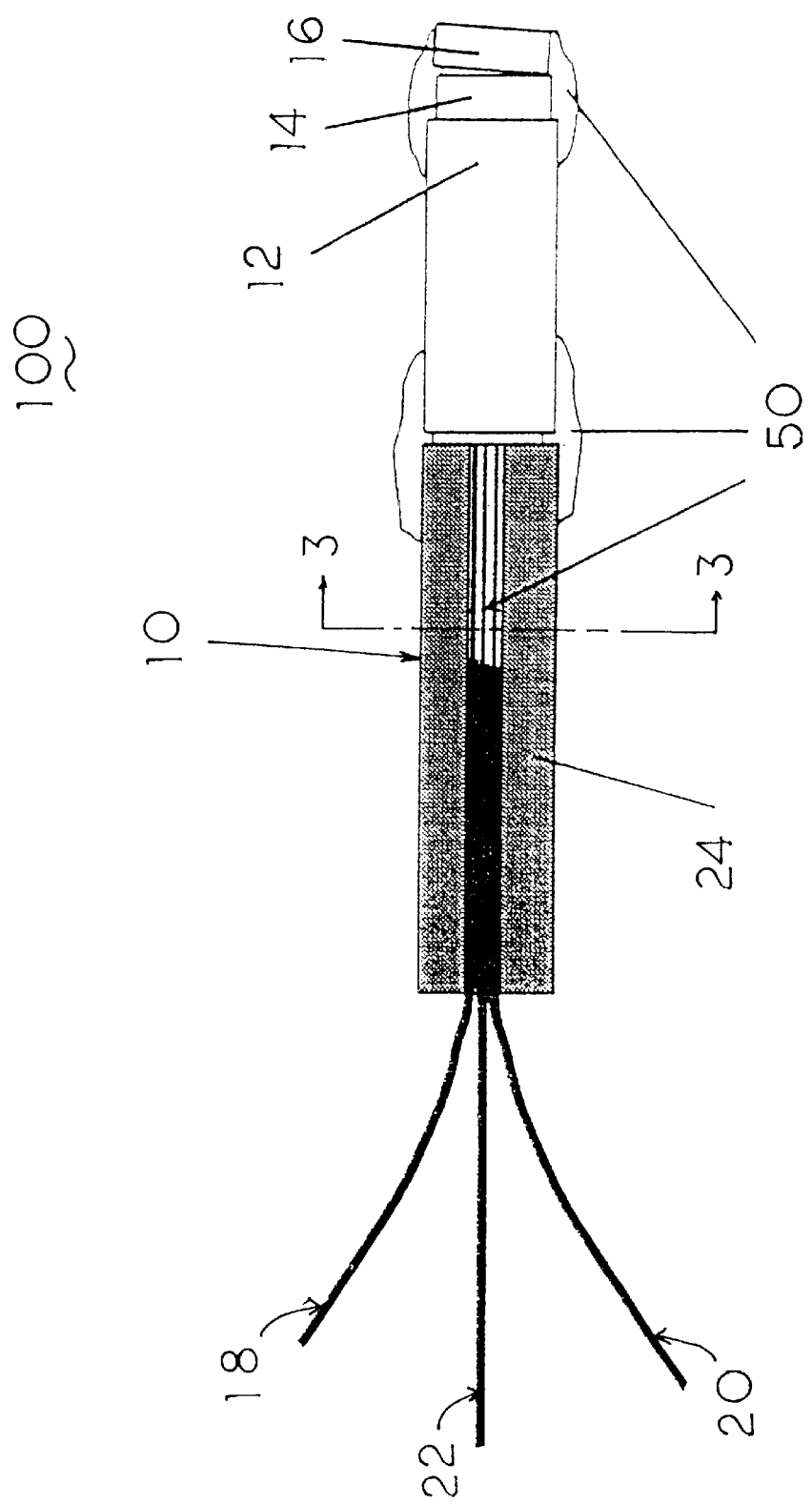
FIG. 1 is a side view of a presently preferred embodiment of a retro-reflective multi-port WDM device with the triple-fiber ferrule, according to the invention.
Figure 2:
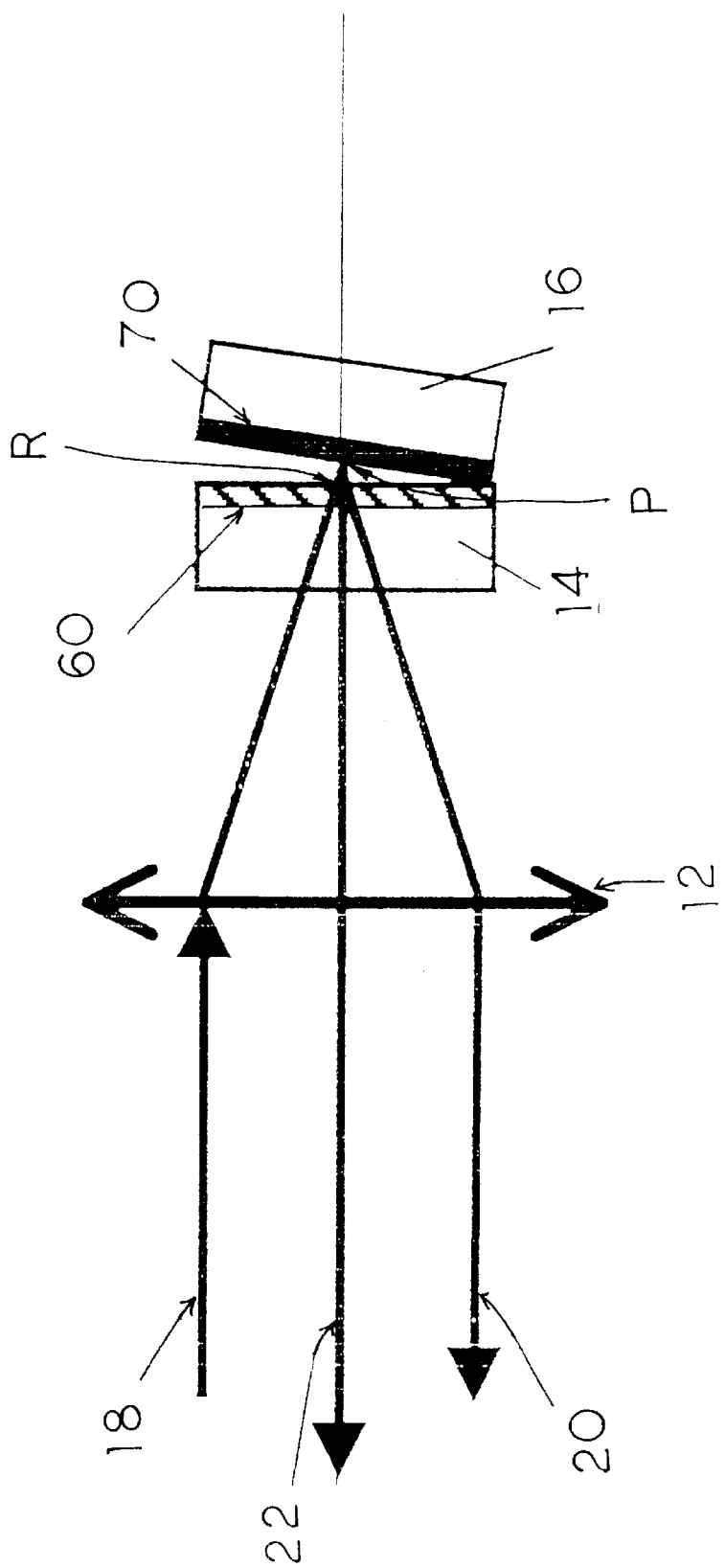
FIG. 2 is a functional illustrative schematic of the device of FIG. 1 to show the light paths therein.
Figure 3:
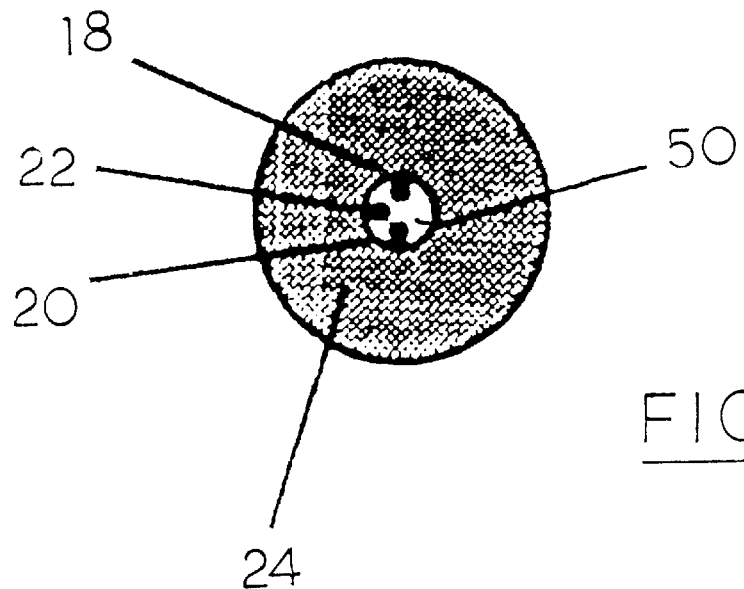
FIG. 3 is a cross-sectional view of the device along line 3—3 of FIG. 1.
Figure 4:
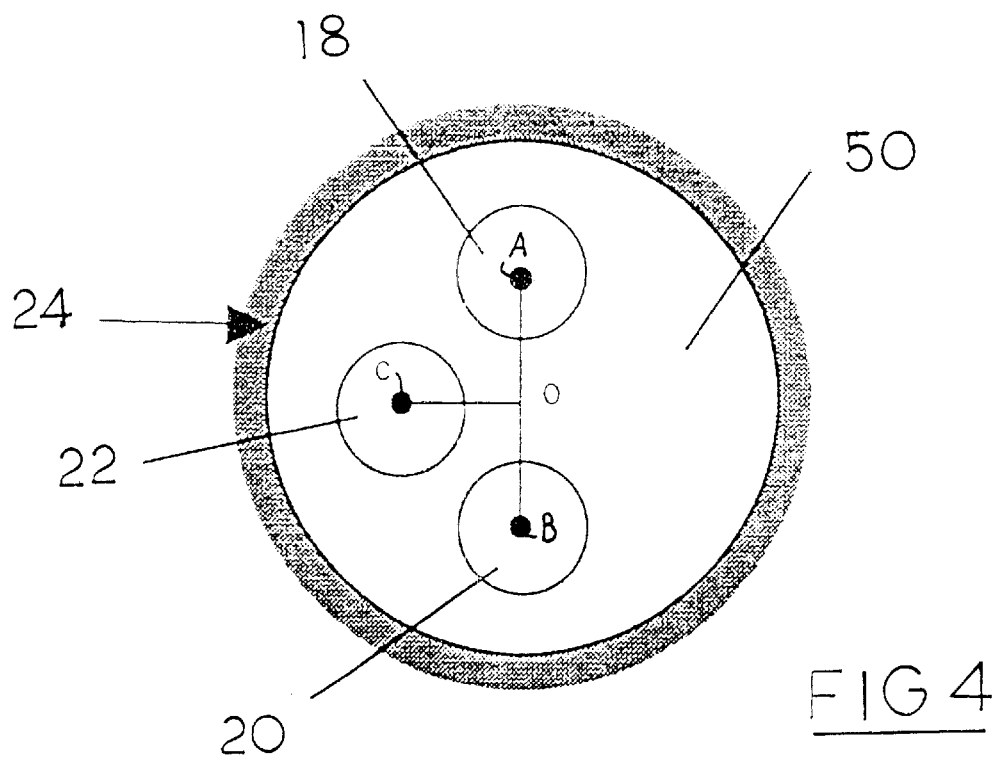
FIG. 4 is an partially enlarged cross-sectional view of the device of FIG. 3.
Figure 5:
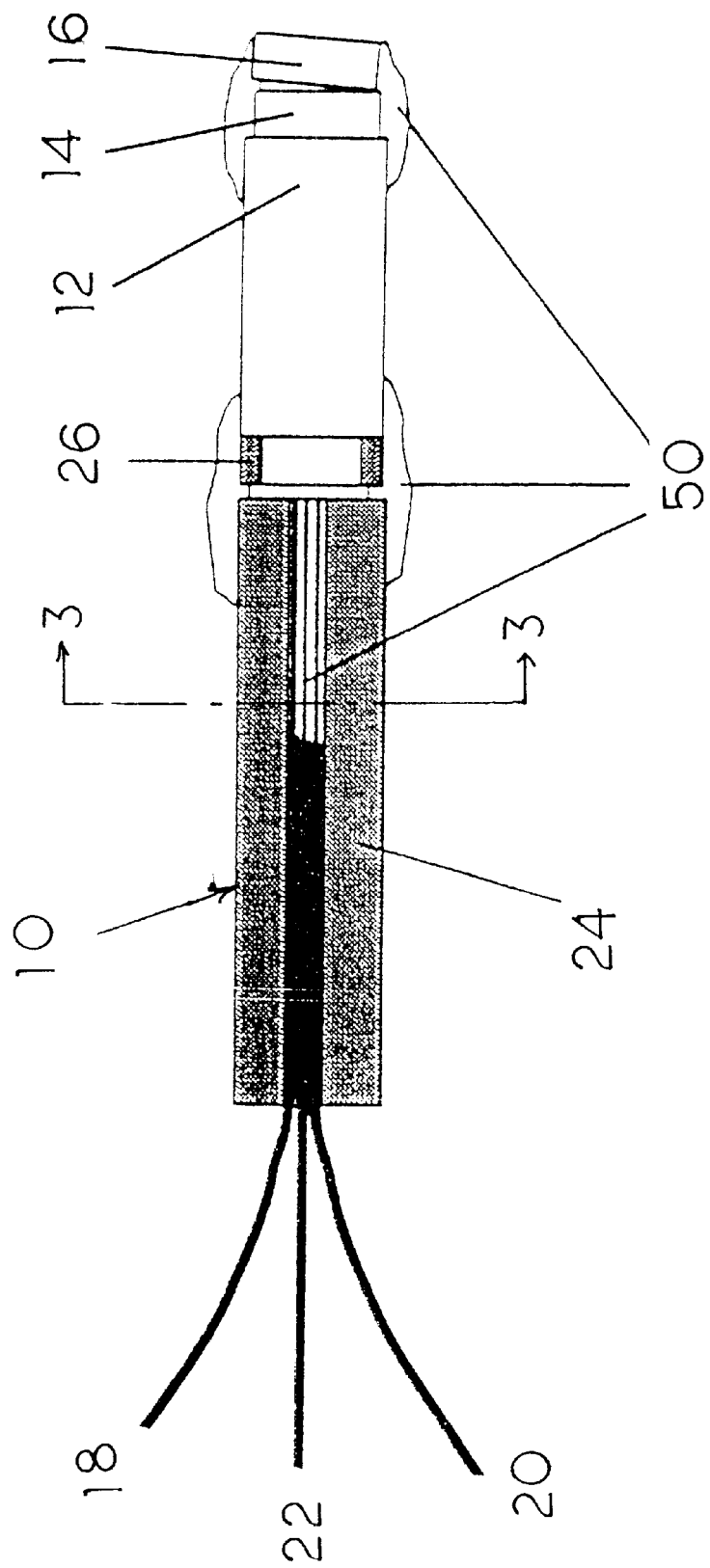
FIG. 5 is a side view of another embodiment of the invention where a spacer ring is added.

It will be noted here that for a better understanding, most of like components are designated by like reference numbers therethrough the various figures in the embodiments. Attention is directed to FIGS. 1–5 wherein a multi-port fiber optic device 100 comprises a triple-fiber ferrule 10, a rod lens 12, a band-pass WDM filter 14 and a reflective mirror 16 with a reflection layer 70 thereon successively disposed on one side of the ferrule 10. All the ferrule 10, the rod lens 12, the filter 14 and the mirror 16 are aligned and bonded together as a single piece by adhesive 50.

A common input first pigtail fiber 18 with a center A, a reflection output second pigtail fiber 20 with a center B and a retro-reflective transmission output third pigtail fiber 22 with a center C extend in the ferrule 10 wherein at the end facet the three centers A, B and C of these three fibers 18, 20 and 22 are located on the same imaginary circumference with a corresponding diameter defined by the common input fiber 18 and the reflection output fiber 20 at two opposite ends thereof. A sleeve 24 encloses the fibers 18, 20 and 22 inside by adhesives. The center O of the circumference is substantially coincident with the optical axis of the lens 12. It is noted that in this embodiment the retro-reflective transmission output fiber 22 is positionably equidistant with the common input fiber 18 and the reflection output fiber 20, thus commonly resulting in a T-shaped configuration with regard to the center O of the circumference.

Under this structures, a multiplexed WDM signal is coupled into the multi-port fiber optic device through a common input pigtail fiber 18 wherein the part of the in-pass-band light will be first collimated by the lens 12 and transmit through the filter 14 in a first time with a specific incidence angle, and successively retro-reflected by the mirror 16, and then pass back through the filter 14 in the second time with the same specific incidence angle of the first time. Successively, the in-pass-band light is then coupled into the retro-reflective transmission output pigtail fiber 22 in the ferrule 10 as a demultiplexed channel. On the other hand, the out-pass-band light passing through the lens 12 will not penetrate the filter 14 to reach the mirror 16, while instead it will be directly reflected back by the filter 14 and coupled into the reflection output pigtail fiber 20 in the ferrule 10 to be transmitted to the next stage for demultiplexing other channels.

It can be understood that the fiber spacing thereamong is selected to match the filter 22, so that the input beam incident upon the filter 14 will define such an incidence angle that the filter center wavelength would substantially coincide with a designated ITU grid line.

The end facet of the ferrule 10 is ground, polished and anti-reflection coated, and is angled relative to its own axis for reducing unwanted back reflection in the device 100. As mentioned before, the ferrule 10 and the lens 12 are aligned together with their angled facets facing each other. Apparently, the filter 14 is bonded, by adhesives 50, to another facet of the lens 12 opposite to the ferrule 10 after the relative position between the lens 12 and the filter 14 is also adjusted and aligned. The lens 12 and the ferrule 10 are bonded together by adhesives 50 too. As mentioned in the previous paragraph, the waist of the collimated light beam of the input pigtail fiber 18 shall coincide with the filter 14, and the insertion loss between the fibers 18, 20 shall be a minimum amount.

It can be understood that because the in-pass-band light will double pass the filter 14, i.e., one being forward and the other being backward, the isolation performance of the device 100 will be doubled in decibel compared with the conventional single-pass structure. It should be appreciated that the mirror 16 is adjusted and aligned with regard to the filter 14 so that the light emitted from the fiber 18 can be coupled back into the fiber 22 with the minimum insertion loss. The mirror 16 is fixed to the filter 14 by adhesives 50.

As mentioned before, the lens 12 is typically a gradient-index (GRIN) rod lens, and has on of the facet angled relative to its own axis in order to reduce unwanted back reflections in the device 100.

It is noted that different from what is disclosed in the copending earlier application where the coating film 60 is applied to the filter facing to the lens, in the invention the coating should be applied to the other side surface of the filter away from the lens for cooperating with the added mirror 16 with a distance as short as possible therebetween. Under this situation, a spacer ring 26 is positioned between the opposite facets of the lens 12 and the ferrule 10 for adjustably positioning the fiber end facet of the ferrule 10 in the focal plane of the lens 12. On the other hand, the coated film of the filter 14 and the mirror 16 should be located substantially coincident with the opposite focal plane of the lens 12.

It should be contemplated that because the mirror 16 is very closely positioned behind the filter 14, the reflection point R on the filter 14 and the reflection point P on the mirror 16 is very close to each other and almost the same. Under this situation, the path of the in-pass-band light, i.e., line AR plus line RB, and the path of the out-pass-band light, i.e., line AP plus line PC, commonly define an imaginary cone structure with an apex at the point R(P) and three points A, B, and C spread on the circumference of the round base with a center O wherein line AB defines the diameter of the round base, and line OC incorporating line AB, results in a T-shaped configuration. It can be understood that point C can be positioned in anywhere along the circumference of the round base of the cone structure, and thus varying configurations under the same principle can be implemented. A series of triple-fiber ferrules with different T-size (or diameter) are manufactured to match the WDM filter by tuning the beam incidence angle. As understood, the T-shaped configuration of the fiber spacing arrangement is currently preferred. It is further understandable that the imaginary plane defined by line AR and line RB, and another imaginary plane defined by line AP and line PC is angle with each other, while typically in neither parallel nor perpendicular manner. Moreover, the included angle between line AR and line RB is larger than the included angle between line AP and line PC, because line AB is the diameter of the round base of the imaginary cone while line AC is only an interception line thereof.

In conclusion, the feature and advantages of the invention are as follows.

(1) The present invention uses a triple-fiber ferrule by performing retro-reflective transmission and reflection for the in-pass-band light and out-pass-band light, respectively. In a preferred arrangement, the three centers of the three fibers are located on the same circumference with a diameter defined by the common input fiber and the reflection fiber. Cooperating with a retro-reflective transmission fiber, the centers of the three fibers and the center of the circumference form a T-shaped configuration arrangement.

(2) Particularly selected fiber spacing is used to match every WDM filter, whereby the invention has a compact and robust structure and especially low cost and high flexibility in achieving a series of different fiber spacing for tuning the center wavelength of a band-pass WDM filter to coincide with that of the ITU grid.

(3) The retro-reflective structure of the invention may reduce almost one half of the material cost and achieve one half of the size as compared to the prior art.

(4) Due to the double-pass of the WDM filter, the key isolation performance of such a WDM multiplexing/demultiplexing device is almost doubled in decibel compared to the conventional single-pass filter structure.

(5) All pigtail fibers in and out extend from only one side of the device, thus being easy for handling.

(6) All the components including the triple-fiber ferrule, GRIN rod lens, WDM filter and the reflective mirror are aligned and adhered together continuously to be a single piece, thus simplifying the assembling procedure, and reducing the cost. The whole dimension is smaller, more compact and robust.

(7) The coating of the filter is applied to the outer side thereof away from the lens, thus optionally requiring a spacer ring between the ferrule and the lens to compensate the thickness of the filter for compliance with the focal plane with regard to end surface of the ferrule.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim.

Therefore, person of ordinary skill in this field are to understand that all such equivalent structures are to be included within the scope of the following claims.

We claim:

1. An optic fiber device comprising:
   a triple-fiber ferrule;
   three fibers disposed in the ferrule and including a common input fiber, a reflection output fiber and a retro-reflective transmission output fiber;
   a lens positioned by the ferrule;
   a WDM filter positioned by the lens opposite to the ferrule; and
   a mirror positioned by the filter opposite to the lens; whereby
   an in-pass-band light enters the device via the common input fiber and leaves the device via the retro-reflective transmission output fiber, while an out-pass-band light enters the device via the common input fiber and leaves the device via the reflection output fiber; wherein
   an incidence angle of said in-pass-band light via the common input fiber relative to the filter is generally equal to another incidence angle of said in-pass-band light via the mirror.

2. The device as defined in claim 1, wherein the input fiber and the two output fibers extend out of the ferrule from a same side thereof.

3. The device as defined in claim 1, wherein centers of the three fibers are arranged to be located on a same circumference, and the center of the input fiber and the center of the reflection output fiber are respectively positioned at two opposite ends of a corresponding diameter of said circumference.

4. The device as defined in claim 3, wherein said circumference defines a circle center, and the centers of said three fibers cooperate with said circle center to form a T-shaped configuration.

5. The device as defined in claim 4, wherein said circle center is substantially coincident with an optical axis of the lens.

6. The optical fiber device as defined in claim 1, wherein a spacer is positioned between the ferrule and the lens.

7. The optical fiber device as defined in claim 1, wherein WDM coating film for demultiplexing is applied to the surface of the filter away from the lens for easy access to another component positioned by said filter opposite to said lens.

8. An optic fiber arrangement comprising:
   a ferrule;
   at least an input fiber and a retro-reflective transmission output fiber disposed in the ferrule;
   a lens positioned the ferrule;
   a WDM filter positioned the lens opposite to the ferrule; and
   a mirror positioned the filter; wherein
   an in-pass-band light enters the device via the input fiber and passes through the filter to reach the mirror, and is successively reflected back to the filter and enters the retro-reflective transmission output fiber and leaves the device as a demultiplexed channel, whereby said light double passes the filter before leaving the device; wherein
   centers of the three fibers are arranged to be located on a same circumference, and the center of the input fiber and the center of the reflection output fiber are respectively positioned at two opposite ends of a corresponding diameter of said circumference.

9. The device as defined in claim 8, wherein the input fiber and the retro-reflective transmission output fiber are located on a same side of the device.

10. An optic fiber device comprising:
    a ferrule;
    at least one fiber disposed in the ferrule;
    a lens positioned by the ferrule; and
    a WDM filter positioned by the lens opposite to the ferrule, said filter defining two opposite side surfaces; wherein
    WDM coating film for demultiplexing is applied to the surface of the filter away from the lens for easy access to another component positioned by said filter opposite to said lens.

11. The device as defined in claim 10, wherein a spacer device is positioned between the lens and the ferrule.

12. An optic fiber device arrangement with two reflections thereof, comprising:
    a ferrule;
    a plurality of fibers disposed in the ferrule;
    a lens positioned by the ferrule;
    a WDM filter positioned by the lens opposite to the ferrule; and
    a mirror positioned by the filter opposite to the lens; wherein
    an in-pass-band light passes the filter and is retro-reflected backwardly by the mirror while an out-pass-band light passes the filter and is directly reflected backwardly by coating film of the filter; wherein
    said circumference defines a circle center which is substantially coincident with an optical axis of the lens where reflection occurs.

13. An optic fiber arrangement comprising:
    a triple-fiber ferrule;
    three fibers disposed in the ferrule and including at least an input fiber, a reflection output fiber and a retro-reflective transmission output fiber;
    a lens positioned by the ferrule;
    a WDM filter positioned by the lens opposite to the ferrule; wherein
    an in-pass-band light enters the device via the common input fiber and leaves the device via the retro-reflective transmission output fiber, while an out-pass-band light enters the device via the common input fiber and leaves the device via the reflection output fiber, and both light travel the corresponding output fibers along a same direction which is away from the filter; wherein
    centers of the three fibers are arranged to be located on a same circumference, and the center of the input fiber and the center of the reflection output fiber are respectively positioned at two opposite ends of a corresponding diameter of said circumference.

14. The arrangement as defined in claim 13, wherein a mirror is positioned by the WDM filter opposite to the lens.

* * * * *